Oct. 13, 1970  P. H. KARVELLAS ET AL  3,534,401
COMPUTER FOR WELL LOGGING SYSTEM
Filed April 20, 1966  2 Sheets-Sheet 1

INVENTORS
PAUL H. KARVELLAS
ERIC C. HOPKINSON
FRANCIS J. NIVEN JR.

ATTORNEY

INVENTORS
PAUL H. KARVELLAS
ERIC C. HOPKINSON
FRANCIS J. NIVEN JR.

ATTORNEY

United States Patent Office 3,534,401
Patented Oct. 13, 1970

3,534,401
COMPUTER FOR WELL LOGGING SYSTEM
Paul H. Karvellas, Eric C. Hopkinson, and Francis J. Niven, Jr., Houston, Tex., assignors to Dresser Industries, Inc., Dallas, Tex., a corporation of Delaware
Filed Apr. 20, 1966, Ser. No. 543,981
Int. Cl. G01v 3/18
U.S. Cl. 235—151.3
9 Claims

ABSTRACT OF THE DISCLOSURE

Two groups of voltage pulses are converted, respectively, into a pair of voltages whose amplitudes are indicative of the number of pulses within the groups and the pair of voltages is coupled into a ratio circuit, thus providing a ratio of the number of pulses in the two groups. Means are provided for adjusting the individual amplitudes of the pair of voltages, the individual amplitudes being independent of the amplitude of the pulses within the groups of voltage pulses. The particular ratio obtained is proportional to the logarithm of the ratio of the pair of voltages.

---

This invention relates to methods and apparatus for radioactivity well logging in oil and gas wells, and more particularly relates to methods and apparatus for measuring the macroscopic thermal neutron capture cross section of subsurface earth formations traversed by a borehole. specifically, this invention relates to methods and apparatus for generating and recording an electrical signal which is proportional to the logarithm of the rate of decline of a thermal neutron population in such formations.

It is now well known to utilize radioactivity methods and apparatus to investigate the lithological characteristics of subsurface earth formations traversed by a borehole. However, there has recently been made commercially available to the oil and gas industry a new logging technique for quantitatively measuring the fluid content of a subsurface formation. As generally described in the copending patent application S. N. 361,159, which was filed by Eric C. Hopkinson and Alexander B. C. Marshall on Apr. 20, 1964, now U.S. Pat. No. 3,358,142, issued Dec. 12, 1967. This new logging technique utilizes a subsurface instrument of novel design, a logging cable for transmitting electrical signals from the subsurface instrument to the surface, and signal processing and recording equipment at the surface for recording these electrical signals from the subsurface instrument.

More particularly, the subsurface instrument is designed to generate sharp pulses of high energy neutrons at a preselected high frequency as the subsurface instrument is passed along the length of the borehole. Each burst of fast neutrons generated by the subsurface instrument establishes a cloud or "population" of fast neutrons in the region of the borehole and adjacent earth surrounding the instrument, and these fast neutrons thereupon slow down to thermal energy to effectively create a thermal neutron population in this region of the borehole and earth. Thereafter, the thermal neutron population declines as the thermal neutrons are captured or absorbed by the borehole fluids and adjacent earth substances at a rate which is proportional to the macroscopic thermal neutron capture cross section of such fluids and earth substances.

As is well known, each capture reaction between a thermal neutron and a nucleus in the fluid and earth, will produce one or more gamma rays. Thus, the decline of the thermal neutron population in the fluid and earth will be manifested by the existence of gamma rays which will also decline in intensity as the thermal neutron population declines. It is well known that the fluid in the borehole will have a substantially higher macroscopic capture cross section than almost any of the surrounding earth formations. Thus, after each fast nuetron pulse generated by the logging instrument, there will be an interval during which the thermal neutron population is gradually captured at a rate which is determined by the capture cross section of the substances about the instrument, and the next succeeding fast neutron pulse is not generated until all or substantially all of the thermal neutrons in the borehole and surrounding earth have disappeared.

The gamma rays hereinbefore described, may easily be detected and counted by conventional scintillation counting apparatus. The scintillation counter functions to produce electrical pulses representative in number and occurrence of the gamma rays detected, and thus the rate of decline of the thermal neutron population is indicated by the frequency of the pulses during two equal time intervals following each burst of fast neutrons from the subsurface instrument. More particularly, a gating circuit may be used to render the scintillation counter responsive to incident gamma rays only during these two preselected detection intervals. Since the thermal neutrons in the borehole will be captured more rapidly than will the thermal neutrons in the surrounding earth, the measurement may be rendered substantially independent of borehole effect by commencing the first detection interval only after the thermal neutrons in the borehole have all been captured.

As shown in the aforementioned S. N. 361,159 patent application, means is provided so that the detector output pulses are sent to the surface over a single cable conductor. In order to prevent confusion between the pulses created during the two detection intervals, the pulses during the first interval are preferably of a different polarity than those created during the second detection interval following each fast neutron burst from the logging instrument.

At the surface, means is provided for generating a pair of voltages respectively proportional to the pulse frequency of each of the two groups of pulses. These two voltages are presently sent to a conventional recorder where they are independently but correlatively displayed on a chart together with a correlative indication of borehole depth.

It is now recognized that the macroscopic thermal neutron capture cross section of the capturing substances may be computed by calculating the logarithm of the ratio of the two recorded voltages. At the present, this calculation is made from readings taken of the two recorded curves on the recorder, since no electrical or mechanical computer has until now been developed which is sufficiently accurate to derive this calculation because the prior art computer circuits require that the two voltages be applied simultaneously, and in the present case the two voltages are generated sequentially since the two detection intervals are sequential. Another problem is that the number of counts in corresponding detection intervals may vary substantially, between fast neutron bursts for reasons which are due only to statistical error. Thus, the prior art computers have been unsatisfactory for the present purposes, because of the severe fluctuations in their output signals which bore no relationship to changes in the macroscopic capture cross section of the earth formations.

A very significant problem, however, has been that prior art computers are responsive to the amplitude of the input pulses, as well as to the frequencies of these pulses, and thus the outputs of these computers include errors which are produced by temperature variations in the equipment rather than variations in the capture cross sections of the earth substances being investigated.

These and other disadvantages and deficiencies of the prior art are overcome by the present invention, and novel methods and apparatus are disclosed herein for providing a recordable electric signal which is directly proportional to the macroscopic thermal neutron capture cross section of the earth substances investigated.

The advantages of the present invention are preferably attained by interconnecting circuitry between the subsurface instrument and the computer circuit which converts the logging instrument output pulses into corresponding pulses of a preselected stable amplitude, and by providing means for calibrating the operation of the computer circuit to conform to this preselected amplitude while maintaining the computer circuitry at a preselected stable temperature. In particular, linearly adjustable means are also provided for varying the amplitude of the signals applied to the computer, and the output of the computer is preferably adjusted to correlate in a preselected offset manner with the operation of the recorder.

Accordingly, it is an object of the present invention to provide novel methods and apparatus for deriving a preselected function of the output signals from a subsurface well logging instrument.

It is also an object of the present invention to provide novel methods and apparatus for deriving an electrical indication of the macroscopic thermal neutron capture cross section of subsurface earth formation traversed by a borehole.

It is further an object of the present invention to provide novel methods and apparatus for deriving a calibrated, temperature-stable electrical indication of the macroscopic thermal neutron capture cross section of subsurface earth formations traversed by a borehole.

It is a specific object of the present invention to provide novel apparatus for deriving from two input signals an output signal which is proportional to the logarithm of the ratio of said two input signals, said apparatus comprising first and second voltage generating means for respectively generating first and second voltages functionally related in magnitude to the frequency of pulses in said two input signals and independent of the amplitudes of said pulses, first calibrating means including adjustable means for adjusting the amplitude of said first output voltage from said first voltage generating means, second calibrating means including linearly adjustable means for linearly adjusting the amplitude of said second output voltage from said second voltage generating means, and temperature-stable computing means for generating a third voltage proportional to the logarithm of the ratio of said first and second voltages from said first and second voltage generating means.

It is also a specific object of the present invention to provide a novel method of deriving from two input signals an output signal which is proportional to the logarithm of the ratio of said two input signals, said method comprising the steps of generating first and second voltages functionally related in magnitude to the frequency of pulses in said two input signals and independent of the amplitudes of said pulses, establishing the amplitude of said first output voltage at a preselected value, linearly adjusting the amplitude of said second output voltage to establish said second output voltage at a preselected value not greater than the preselected value of said first output voltage, generating in response to said first and second voltages and independently of ambient temperature a third voltage proportional to the logarithm of the ratio of said first and second voltages, and recording said third voltage.

These and other objects and features of the present invention will be apparent from the following description of the invention, wherein reference is made to the figures of the accompanying drawings.

Figure 1:
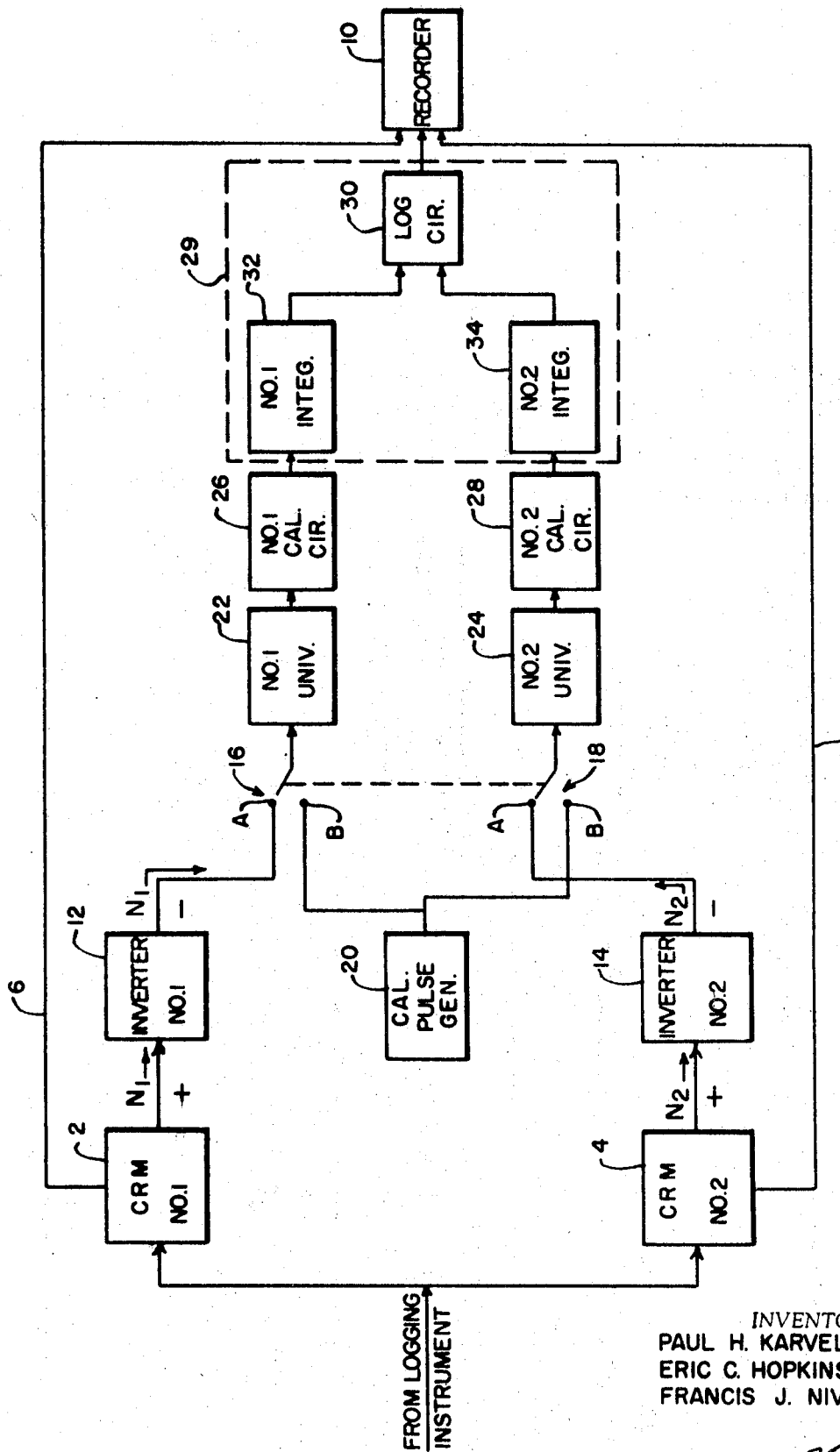
FIG. 1 is a functional representation of one embodiment of the surface equipment employing the present invention.

Referring now to FIG. 1, there may be seen a functional representation of the surface equipment comprising the preferred form of the present invention. As hereinbefore stated, the macroscopic thermal neutron capture cross section of the earth substances to be investigated is proportional to the natural logarithm of the ratio of the gamma rays detected during two equal time intervals following each fast neutron burst. However, this relationship is more properly expressed as follows:

$$\Sigma = \log_e \frac{N_1}{N_2} \left( \frac{1}{V \Delta t} \right) \qquad (1)$$

wherein $N_1$ is the number of pulses arriving at the surface during the first detection interval following pulsation of the fast neutron source, $N_2$ is the number of pulses arriving during the second detection interval, $V$ is the velocity of a thermal neutron, and $\Delta t$ is the interval between the two detection intervals.

In FIG. 1, therefore, there is provided two conventionally designed count rate meters 2 and 4 having their inputs connected to receive detector output pulses from the subsurface instrument in the borehole. As hereinbefore stated, it is preferable to send both groups of pulses to the surface by way of the same cable conductor, and therefore the pulses in $N_1$ are necessarily opposite in polarity with respect to the pulses in $N_2$. Accordingly, the two count rate meters 2 and 4 necessarily must be made responsive to pulses of different polarity, although both count rate meters 2 and 4 should generate output signals of the same (preferably positive) polarity. The output signals of the No. 1 count rate meter 2 constitute $N_1$, and the output signals of the No. 2 count rate meter 4 constitutes $N_2$, insofar as the present invention is concerned.

The conventional count rate meter has two output signals, one signal being a D.C. voltage representative of the count rate of the pulses composing its input signal, and the other output signal being amplified and shaped pulses corresponding to the pulses composing the input signal. In FIG. 1, there may be seen connections 6 and 8 which serve to respectively conduct the D.C. output signals from the No. 1 and No. 2 count rate meters 2 and 4 dirrtly to the recorder 10 in a conventional manner. However, in the present invention it is necessary to also connect the output pulses from the No. 1 and No. 2 count rate meters 2 and 4 to the No. 1 and No. 2 inverters 12 and 14 respectively.

It is the function of the inverters 12 and 14 to further shape the pulses from the count rate meters 2 and 4 into pulses of a form suitable to the particular circuitry and operating characteristics of the other portion of the system depicted by FIG. 1. Accordingly, the No. 1. inverter 12 is preferably adjusted to generate low amplitude, negative pulses which are relatively sharp, in response to the pulses generated by the No. 1 count rate meter 2, and to apply these low amplitude pulses to terminal A of the No. 1 selector switch 16, the arm of which is connected to the input of the No. 1 univibrator 22. Similarly, the output $N_2$ pulses from the No. 2 inverter 14, which are also negative and of low amplitude as well as relatively sharp, are applied to terminal A of the No. 2 selector switch 18. The switch arm of switch 18, which may be seen to be ganged with the switch arm of switch 16, is connected to the input of No. 2 univibrator 24.

As may further be seen in FIG. 1, terminals B of switches 16 and 18 are both connected to the output of a calibrate pulse generator 20. Thus, switches 16 and 18 are positioned during normal logging operations so that their respective arms are connected to terminals A. Alternatively, when it is sought to calibrate the circuitry depicted in FIG. 1, the arms of switches 16 and 18 are positioned to connect to terminals B, to connect the inputs of univibrators 22 and 24 to the calibrate pulse generator 20, the function of which will hereinafter be described.

During logging operations, No. 1 and No. 2 univibrators 22 and 24 each function to deliver to the No. 1 and and No. 2 calibrate circuits 26 and 28 a flat-topped pulse in response to each output pulse generated respectively by the No. 1 and No. 2 inverters 12 and 14. The output $N_1$ pulses from the No. 1 univibrator 22 pass through the No. 1 calibrate circuit 26 to the No. 1 integrator 32 which produces an output voltage representative of the frequency of the pulses in each $N_1$ group or time interval. Similarly, the output $N_2$ pulses from the No. 2 univibrator 24 pass through the No. 2 calibrate circuit 28 to the No. 2 integrator 34 which functions to generate an output voltage representative of the frequency of the pulses in each $N_2$ interval or pulse group.

The $N_1$ and $N_2$ output voltages generated respectively by the No. 1 and No. 2 integrators 32 and 34 are applied to the input terminals of a conventional logarithm circuit 30 which functions to derive an output voltage representative of the natural logarithm of the ratio of these two voltages. The output voltage from the logarithm circuit 30 is then recorded on the recorder 10 in correlation with the signals arriving at the recorder 10 by way of connections 6 and 8. The No. 1 integrator 32 is necessarily adapted so that its output will always continue for a period greater than $\Delta t$, so that it will overlap the period during which the No. 1 integrator 34 generates its $N_2$ output signal.

As will hereinafter be explained in detail, it is usually necessary and always desirable to calibrate the system before logging the well. Accordingly, the No. 1 and No. 2 selector switches 16 and 18 should be positioned to connect to terminals B, so that the calibrate pulse generator 20 is connected to the univibrators 22 and 24. Inasmuch as the input to the No. 1 univibrator 22 is the same signal as that applied to the No. 2 univibrator 24, the outputs of the two integrator circuits 32 and 34 should be identical. Thus, the No. 1 and No. 2 calibrate circuits 26 and 28 are employed to adjust amplitudes of the inputs to the integrator circuits 32 and 34, so that their outputs will then be equal.

It should be understood that components such as the count rate meters 2 and 4, inverters 12 and 14, the univibrators 22 and 24, the calibrate pulse generator 20, and the logarithm circuit 30 are all components of standard design. However, it should also be understood that the gains of the amplifier circuits contained in the logarithm circuit 30 are subject to temperature fluctuations, and since the computer portion of the logarithm circuit 30 is responsive to the amplitudes of its input signals, it is necessary to stabilize these amplifier circuits with respect to temperature. This is accomplished by locating a conventional heating unit or "oven," indicated by dashed line 29, adjacent the amplifiers so that their temperature will be continuously held at a stabilized level well above ambient temperature. The computer or logarithm module in the logarithm circuit 30 is also sensitive to temperature fluctuations. However, the same "oven" can be used to override ambient temperature fluctuations for the logarithm module.

Figure 2:
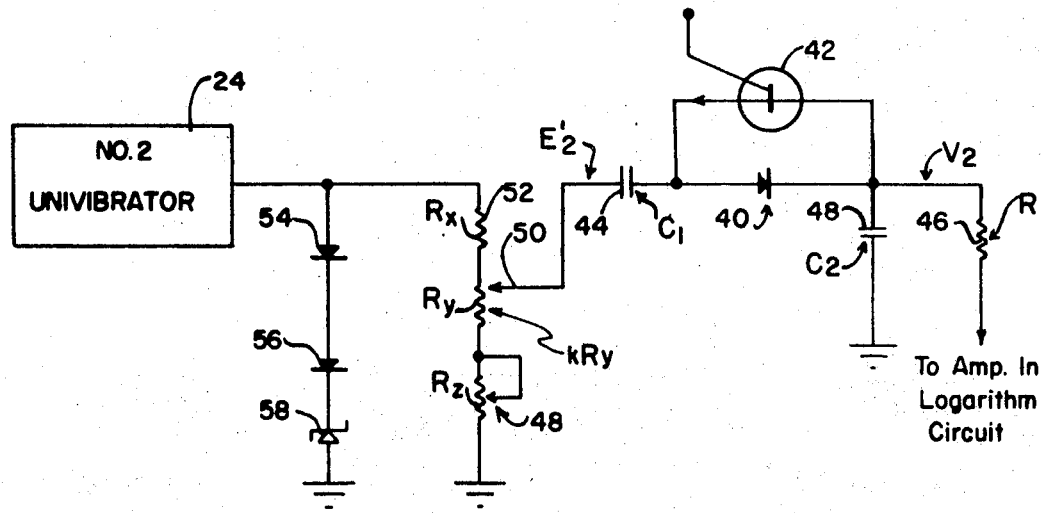
FIG. 2 is a schematic diagram of a portion of the equipment depicted in FIG. 1.

Referring now to FIG. 2, there may be seen a schematic diagram of the No. 2 calibrate circuit 28 and No. 2 integrator 34 depicted in FIG. 1. In order to appreciate the features of this circuitry, it must be understood that the integrators 32 and 34 are not only unstable at extreme temperatures, but that their output signals will deviate with respect to linearity according to fluctuations or changes in the amplitudes of their input signals. In theory, the output voltage from the integrator 34 is equal to the product of the amplitude of its input signal, the capacitance of $C_1$, the magnitude of resistance R, and the frequency of the input signal pulses from the No. 2 univibrator 24. This relationship can be stated generally as follows:

$$V = EC_1 Rf \quad (2)$$

However, the true relationship is more particularly stated as follows:

$$V = (E' - V_{d1} - V_{be}) C_1 R f \quad (3)$$

where $V_{d1}$ is the voltage drop across the diode 40, $V_{be}$ is the voltage drop across the base and the emitter of the transistor 42, $E'$ is the amplitude of the input signal to the No. 2 integrator circuit 34, $C_1$ is the capacitance of capacitor 44, R is the resistance provided by resistor 46, and $f$ is the frequency of input pulses arriving at capacitor 44.

Nevertheless, it can be seen that the No. 2 calibrating circuit 28 includes diodes 54 and 56 and a Zener diode 58. Thus, the voltage output of the circuitry depicted in FIG. 3 will, when $k$ is unity, be as follows:

$$V_2 = [V_{d2} + V_{d3} + V_z - V_{d1} - V_{be}] C_1 R f \quad (4)$$

wherein $V_{d2}$ and $V_{d3}$ are the voltage drops across diodes 54 and 46, and where $V_z$ is the voltage drop across the Zener diode 58. If $V_{d2}$ is equal to $V_{d3}$, the following relationship may be found:

$$V_2 = [2V_{d2} + V_z - V_{d1} - V_{be}] C_1 R f \quad (5)$$

Moreover, if $V_{d1}$ is assumed to be approximately equal to $V_{d2}$, then $$V_2 \cong [V_{d1} - V_{be} + V_z] C_1 R f \quad (6)$$

And, if $V_{d1}$ is assumed to be approximately equal to $V_{be}$, then:

$$V_2 \cong V_z C_1 R f \quad (7)$$

However, in the circuitry depicted in FIG. 2, the Zener diode 58 is chosen to be temperature stable. Thus, the output voltage $V_z$ from the No. 2 integrator 34 is obviously stable with respect to temperature fluctuations, since capacitance 44 and resistance 46 may also be chosen to be temperature stable.

As hereinbefore stated, it is the purpose of the integrators 32 and 34 to develop output voltages ($V_1$ and $V_2$) which are each directly proportional to the frequency of the pulses in their input signals. However, as may be seen by Equation 3, the output voltage ($V_1$ or $V_2$) is also related to the amplitude of the input signal E, and it may also be seen that this relationship is not linear in character because $V_{d1}$ and $V_{be}$ are constant. Accordingly, what is obviously needed under the circumstances is some method or means for adjusting the input voltage to the No. 2 integrator 34 so that the linearity relationship of $(E - V_{d1} - V_{be})$ to V is maintained for any value of E (at least within an acceptable operating range).

Thus, it is necessary to provide means for varying the voltage of the input signal to either integrator 32 or 34, which means is itself adjustable in a manner directly proportional to the variation produced in the output voltage generated by either of the two integrators 32 or 34. Thus, potentiometers 48 and 50 and resistor 52 are provided in the circuitry depicted in FIG. 2 for accomplishing this purpose. As so arranged, the following relationship may be seen to be established:

$$E_2' = \left[ E_2 \frac{kRy + Rz}{Rx + Ry} + Rz \right] \quad (8)$$

where $kRy$ the resistance turned into the circuit by potentiometer 50, is never greater than Ry, Rx is the resistance provided by resistor 52, and wherein Rz is the resistance turned into the circuit by potentiometer 48.

As hereinbefore stated:

$$V = EC_1 R f \quad (2)$$

when E is equal to $E' - V_{d1} - V_{be}$. Accordingly, if $E_2''$ is equal to the sum of $V_{d1}$ and $V_{be}$, and if the voltage drop across the resistance turned into circuit by potentiometer 48 is made equal to $E_2''$, then:

$$V_2 = E_2 \left[ \frac{kRy}{Rx + Ry + Rz} \right] C_1 Rf \qquad (9)$$

It will therefore be apparent that potentiometer 50 provides a linearly adjustable means for linearly varying the output voltage generated by the No. 2 integrator 34, since $kRy$, which is the value of the resistance turned into the circuit by potentiometer 50, can be easily made linearly adjustable by conventional means.

In addition to the adjustments required to be made with potentiometer 48 in the No. 2 calibrating circuit 28, it is also necessary to calibrate the system to cause the output signals from the logarithm circuit 30 to conform to the operation of the recorder 10. This is preferably done by calibrating the "zero" of the computer system depicted in FIG. 1 to conform to "zero" on the recorder 10.

This will become apparent if it is appreciated that $\Sigma$, which is the objective of the present invention, is based on the decline rate of the thermal neutron population in the formation substances sought to be investigated. The thermal neutron population will always decline, no matter what the formation substances may be, and thus $N_2$ can never be permitted to exceed $N_1$. Moreover, $N_2$ will equal $N_1$ only when both are zero.

In addition, however, it is often desirable to off-set the pen trace representing $\Sigma$ on the recorder 10 chart, since this will keep the $\Sigma$ trace or "curve" from interfering with the two traces which are directly indicative of $N_1$ and $N_2$ as hereinbefore explained. To avoid such interference, it is desirable to provide a preselected off-set (preferably five chart divisions on the conventional chart) between the electrical zero of the recorder 10 and an actual zero value of $\Sigma$. This may be obtained by assuming that $\Sigma$, as measured and computed by the logging system and the apparatus depicted in FIG. 1, will never be less than 10 units, and by correlating this minimum value for $\Sigma$ (as measured by the logging system and computer) with zero on the chart of the recorder 10.

It will therefore be apparent that $\Sigma$ will be equal to zero when $N_1$ is equal to $N_2$. Thus, $\Sigma$ is equal to zero when the output voltages from the two integrators 32 and 34 are equal, and the computer system depicted by FIG. 1 must therefore be adapted or adjusted to provide a negative output signal from the logarithm circuit 30, which reaches its maximum (negative) value when the actual value of $\Sigma$ is zero, which linearly rises to zero voltage output when the actual value of $\Sigma$ is equal to 10 units, and which linearly increases in a positive direction according to increases in the actual value of $\Sigma$.

Figure 3:
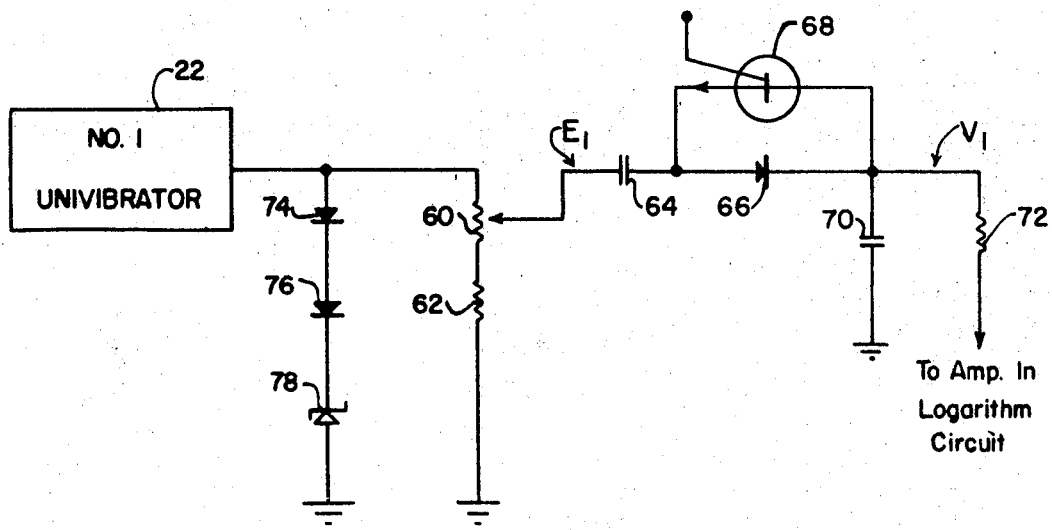
FIG. 3 is a schematic diagram of another portion of the equipment depicted in FIG. 1.

Accordingly, the computer system depicted by FIG. 1 may be calibrated by establishing equal voltage outputs from the two integrators 32 and 34, whereby the logarithm circuit 30 will be caused to produce a zero voltage output correlating with the zero of the recorder 10. This relationship is preferably stated as follows:

$$\frac{V_1}{V_2} = \frac{E_1' - V_{d1} - V_{be}}{E_2' - V_d - V_{be}} \qquad (10)$$

wherein it is assumed that $C_1$, $R$, $V_{d1}$, $V_{be}$, and $f$ are equal in both integrators 32 and 34. The No. 2 calibrating circuit 28 depicted generally in FIG. 1 is shown in FIG. 2 to include resistor 52 and potentiometers 50 and 48 as hereinbefore explained. Referring now to FIG. 3, there may be seen a schematic representation of the No. 1 calibrating circuit 26 and the No. 1 integrator 32.

It will be immediately apparent that the two integrators 32 and 34 are identical in design, since capacitance 64 is functionally equal to capacitance 44, diode 66 is functionally equal to diode 40, transistor 68 is functionally equal to transistor 42, capacitor 70 is functionally equal to capacitor 48, and resistance 72 is functionally equal to resistance 46. Furthermore, the only basic difference between the two calibrating circuits 26 and 28 is that there is no component in FIG. 3 which corresponds to resistor 52 in FIG. 2. More particularly, potentiometer 60 is functionally equivalent to potentiometer 50, and resistor 62 (which need not be adjustable in the No. 1 calibrating circuit 26) is functionally equivalent to potentiometer 48.

As hereinbefore stated, it is necessary that $N_1$ never be less than $N_2$. Accordingly, resistor 52 is required in the No. 2 calibrating circuit 28 to provide a means for limiting the maximum output voltage $V_2$ from the No. 2 integrator 34. However, no such component is necessary in the No. 1 calibrating circuit 26, and thus no such component need be included in the circuitry depicted in FIG. 3.

It is necessary, however, that the No. 1 calibrating circuit 26 include provision for rendering the No. 1 integrator 32 temperature stable. Thus, diodes 74 and 76 are included which are functionally equal to diodes 54 and 56, and Zener diode 78 is included as the functional equivalent of Zener diode 58.

It will be clearly apparent from the foregoing description of the present invention, that numerous modifications and changes may be made in the circuitry and arrangements depicted in the drawings and described herein, without departing from the essential concept of the present invention. Accordingly, the forms of the invention described herein and depicted in the drawings, are illustrative only and are not intended to limit the scope of the invention.

What is claimed is:

1. Apparatus for deriving from two input signals an output signal which is proportional to the logarithm of the ratio of said two input signals, wherein each of said input signals comprises a series of voltage pulses, comprising first and second voltage generating means for respectively generating first and second voltages functionally related in amplitude to the total number of pulses in said two input signals and independent of the amplitudes of said pulses, first calibrating means including adjustable means for adjusting the amplitude of said first voltage from said first voltage generating means, second calibrating means including linearly adjusting means for linearly adjusting the amplitude of said second voltage from said second voltage generating means, and temperature-stable computing means for generating a third voltage proportional to the logarithm of the ratio of said first and second voltages from said first and second voltage generating means.

2. Apparatus as described in claim 1, including means for generating first and second groups of preselected pulses in correlation with said voltage pulses in said first and second input signals, and wherein said first and second voltage generating means are responsive, respectively, to the amplitude and frequency of said first and second groups of pulses.

3. Apparatus as described in claim 2 wherein said preselected pulses are flat-topped in shape.

4. Apparatus as described in claim 3, including a third pulse generating means for generating calibration pulses, and a selector switch interconnected between said third pulse generating means and said means for generating said first and second preselected groups of pulses.

5. Apparatus as described in claim 4, wherein said means for generating first and second groups of pulses include first and second univibrators, wherein said first and second voltage generating means include first and second integrator circuits, and wherein said means for generating a third voltage is responsive to said first and second integrator circuits.

6. Apparatus as described in claim 5, including first and second inverter means responsive to said two input signals to generate first and second output signals composed respectively of electrical pulses of preselected polarity and minimum amplitude, wherein said selector switch is interconnected between said first and second inverters means and said first and second univibrator means and also between said pulse generating means and said first and second univibrator means.

7. Apparatus as described in claim 6, including adjustable recording means responsive to said third output voltage.

8. Apparatus as described in claim 7, wherein said recording means is also responsive to said two input signals.

9. An apparatus for deriving from two time-separated input signals an output signal proportional to the ratio of said two input signals wherein each of said input signals comprises a series of voltage pulses, comprising:

first and second voltage generating means for respectively generating first and second voltages functionally related in amplitude to the total number of pulses in said two input signals and independent of the amplitudes of said pulses;

delay means for causing said first and second voltages to overlap in time; and computer means for generating a third voltage proportional to the ratio of said first and second voltages.

References Cited
UNITED STATES PATENTS

| | | | |
|---|---|---|---|
| 3,057,555 | 10/1962 | Case | 235—194 X |
| 3,087,111 | 4/1963 | Lehan et al. | 324—1 |
| 3,182,182 | 5/1965 | Engelman | 235—196 |
| 3,263,159 | 7/1966 | Albright | 324—1 |
| 3,273,448 | 9/1966 | Kelly. | |

MALCOLM A. MORRISON, Primary Examiner

J. F. RUGGIERO, Assistant Examiner

U.S. Cl. X.R.

235—196; 324—1